(12) United States Patent
Shiono et al.

(10) Patent No.: US 6,517,946 B2
(45) Date of Patent: Feb. 11, 2003

(54) CURABLE COMPOSITION

(75) Inventors: Mikio Shiono, Usui-gun (JP); Takashi Matsuda, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/778,084

(22) Filed: Feb. 7, 2001

(65) Prior Publication Data

US 2001/0018491 A1 Aug. 30, 2001

(30) Foreign Application Priority Data

Feb. 7, 2000 (JP) ........................................ 2000-028762

(51) Int. Cl.⁷ .......................... B32B 15/08; C08G 77/48
(52) U.S. Cl. ..................... 428/450; 428/447; 524/492; 524/493; 524/588; 528/15; 528/31; 528/32; 528/42
(58) Field of Search ................................ 524/492, 493, 524/588; 528/15, 31, 32, 43; 428/447, 450

(56) References Cited

U.S. PATENT DOCUMENTS 5,656,711 A  8/1997 Fukuda et al.
6,284,860 B1 * 9/2001 Sommer et al. .............. 528/23

FOREIGN PATENT DOCUMENTS

| EP | 765 916 A | 4/1997 |
| EP | 923 084 A | 6/1999 |
| EP | 967 251 A | 12/1999 |
| EP | 1 081 185 A | 3/2001 |
| JP | 9-95615 | 4/1997 |

* cited by examiner

Primary Examiner—Robert Dawson
Assistant Examiner—Marc S. Zimmer
(74) Attorney, Agent, or Firm—Millen, White, Zelano & Braningan, P.C.

(57) ABSTRACT

A curable composition comprising (A) a fluorinated amide compound, (B) a specific fluorinated organohydrogensiloxane, (C) a platinum group compound, (D) an organosiloxane adhesion-imparting agent, (E) a silica powder having a BET specific surface area of at least 50 $m^2/g$ and (F) an organosilane or organosiloxane surface treatment agent for the silica powder provides a cured product endowed with excellent resistance to solvents, chemicals and heat, outstanding low-temperature properties, a low water-vapor permeability and outstanding electrical characteristics. When heated at a relatively low temperature for a relatively short period of time, the composition cures to a form having good adhesion and good durability of adhesion to base materials such as metals and plastics.

19 Claims, No Drawings

CURABLE COMPOSITION

BACKGROUND OF THE INVENTION

1. Field of the Invention

The present invention relates to addition reaction-curable compositions, and particularly to addition reaction-curable compositions which provide fluorinated elastomers having a good adhesion to various base materials and excellent bond durability.

2. Prior Art

Curable fluorinated elastomer compositions which are curable by means of an addition reaction between alkenyl groups and hydrosilyl groups are already known to the art. JP-A 9-95615 discloses compositions endowed with tack properties by the further addition, as a third constituent, of an organopolysiloxane having hydrosilyl groups and epoxy and/or trialkoxysilyl groups. Such compositions can be cured by heating for a short period of time and, when cured, are capable of bonding to a broad range of base materials. The resulting cured product has excellent resistance to solvents, chemicals and heat, excellent low-temperature properties, a low water-vapor permeability and outstanding electrical characteristics.

Such compositions bond to various kinds of base materials when heat-cured, but the bond is of insufficient durability. Hence, these prior-art compositions have a poor long-term reliability as adhesives. Because good long-term reliability is essential in automotive parts and in electrical and electronic components, there exists a strong desire for improved bond durability in compositions of this type which are used as adhesives.

SUMMARY OF THE INVENTION

It is therefore an object of the invention to provide curable compositions capable of forming a fluorinated elastomer having good adhesion to various types of base materials and also endowed with excellent bond durability.

The inventors have discovered that curable compositions comprising (A) a specific type of fluorinated amide compound, (B) a specific fluorinated organohydrogensiloxane as a crosslinking agent and a chain extender, (C) a platinum group compound as a catalyst, (D) an organosiloxane having at least one hydrogen atom bonded directly to a silicon atom and at least one epoxy group and/or trialkoxysilyl group bonded to a silicon atom through a carbon atom or a carbon atom and an oxygen atom per molecule, and preferably having also a fluoroalkyl or perfluoropolyether group, (E) silica powder as a filler and (F) a specific organosilane or organosiloxane as a surface treatment agent for the silica powder are endowed with excellent resistance to solvents, chemicals and heat, outstanding low-temperature properties, a low water-vapor permeability, and excellent electrical properties. Moreover, such compositions bond well to various types of base materials, and have outstanding bond durability.

Accordingly, the invention provides a curable composition comprising:

(A) a fluorinated amide compound of general formula (1) below

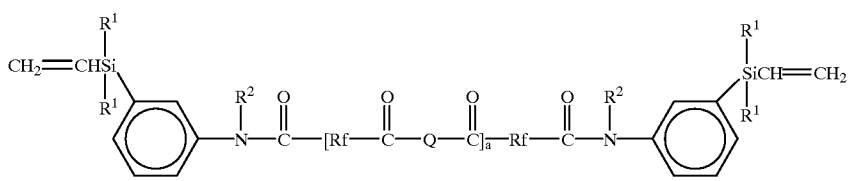

(1)

wherein $R^1$ is a substituted or unsubstituted monovalent hydrocarbon group, $R^2$ is a hydrogen atom or a substituted or unsubstituted monovalent hydrocarbon group, Q is a group of general formula (2)

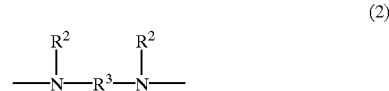

(2)

in which $R^2$ is as defined above and $R^3$ is a substituted or unsubstituted divalent hydrocarbon group which may be separated by at least one atom selected from among oxygen, nitrogen and silicon atoms, or a group of general formula (3)

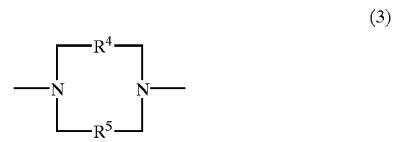

(3)

in which $R^4$ and $R^5$ are each independently a substituted or unsubstituted divalent hydrocarbon group, Rf is a divalent perfluoroalkylene or divalent perfluoropolyether group, and the letter "a" is 0 or a positive integer;

(B) a fluorinated organohydrogensiloxane having at least one monovalent perfluorooxyalkyl, monovalent perfluoroalkyl, divalent perfluorooxyalkylene or divalent perfluoroalkylene group and at least two hydrosilyl groups per molecule;

(C) a catalytic amount of a platinum group compound;

(D) an organosiloxane having, per molecule, at least one hydrogen atom bonded directly to a silicon atom and at least one epoxy group and/or trialkoxysilyl group bonded to a silicon atom through a carbon atom or a carbon atom and an oxygen atom;

(E) a silica powder having a BET specific surface area of at least 50 $m^2/g$; and (F) an organosilane or organosiloxane having, per molecule, at least one monovalent perfluorooxyalkyl, monovalent perfluoroalkyl, divalent perfluorooxyalkylene or divalent perfluoroalkylene group and at least one hydroxy group and/or alkoxy group bonded directly to a silicon atom;

wherein component B is included in an amount corresponding to 0.5 to 5 moles of hydrosilyl groups per mole of aliphatic unsaturated groups in the composition.

DETAILED DESCRIPTION OF THE INVENTION

The curable composition of the present invention includes a fluorinated amide compound of formula (1) below as the base polymer, a fluorinated organohydrogensiloxane as a crosslinking agent or chain extender for the base polymer, a platinum group compound as the catalyst, an organosiloxane as an adhesion-imparting agent, a silica powder as a filler, and a fluorinated organosilane or organosiloxane as a surface treatment agent for the silica powder.

The first essential constituent of the inventive composition, referred to hereinafter as component A, is a fluorinated amide compound of the following general formula (1)

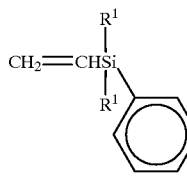

(1)

In formula (1), $R^1$ is a substituted or unsubstituted monovalent hydrocarbon group of preferably 1 to 10 carbons, especially 1 to 8 carbons, and preferably without an aliphatic unsaturated bond. Illustrative examples include alkyl groups such as methyl, ethyl, propyl, isopropyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl and hexenyl; aryl groups such as phenyl, tolyl, xylyl and naphthyl; aralkyl groups such as benzyl, phenylethyl and phenylpropyl; and halogen-substituted alkyl groups composed of any of the above groups on which some or all of the hydrogen atoms are replaced with halogen atoms, such as chloromethyl, chloropropyl, bromoethyl, 3,3,3-trifluoropropyl and 6,6,6,5,5,4,4,3,3-nonafluorohexyl.

$R^2$ is a hydrogen atom or a substituted or unsubstituted monovalent hydrocarbon group of preferably 1 to 10 carbons, especially 1 to 8 carbons, and preferably without an aliphatic unsaturated bond. The monovalent hydrocarbon groups are exemplified by the same groups as mentioned above for $R_1$, including alkyl groups such as methyl, ethyl, propyl and isopropyl; cycloalkyl groups such as cyclohexyl; alkenyl groups such as vinyl and allyl; aryl groups such as phenyl and tolyl; and halogen-substituted alkyl groups composed of any of the above groups on which some of the hydrogen atoms are replaced with halogen atoms, such as chloromethyl, chloropropyl, 3,3,3-trifluoropropyl and 6,6,6,5,5,4,4,3,3-nonafluorohexyl.

Q is a group of general formula (2) or general formula (3) below.

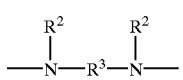

(2)

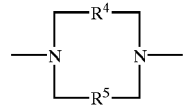

(3)

In formula (2), $R^2$ is as defined above. $R^3$ may be any substituted or unsubstituted divalent hydrocarbon group, although a divalent hydrocarbon group of 1 to 20 carbons, and especially 2 to 10 carbons, is preferred. Specific examples include alkylene groups such as methylene, ethylene, propylene, methylethylene, butylene and hexamethylene; cycloalkylene groups such as cyclohexylene; arylene groups such as phenylene, tolylene, xylylene, naphthylene and biphenylene; any of the above groups in which some of the hydrogen atoms have been replaced with halogen atoms; and combinations of such substituted or unsubstituted alkylene and arylene groups.

The $R^3$ group may be linked through one or more intervening atom selected from among oxygen, nitrogen and silicon atoms. If the atom is oxygen, the linkage may be —O—. If the atom is nitrogen, the linkage may be —NR'—, where R' is a hydrogen atom or an alkyl or aryl group of 1 to 8 carbons, and preferably 1 to 6 carbons. If the atom is silicon, the linkage may be a group containing a linear or cyclic organosiloxane, such as those of the following formulas or an organosilylene group.

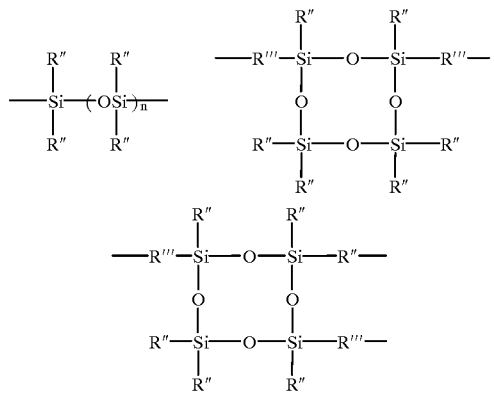

In the above formulas, R" is an alkyl or aryl group of 1 to 8 carbons which may be exemplified by the same groups as mentioned above for $R^1$ and $R^2$; R''' is an alkylene or arylene group of 1 to 6 carbons which may be exemplified by the same groups as mentioned above for $R^3$; and the letter n is an integer from 0 to 10, and preferably from 0 to 5.

Specific examples of such $R^3$ groups linked through an intervening oxygen, nitrogen or silicon atom include the following

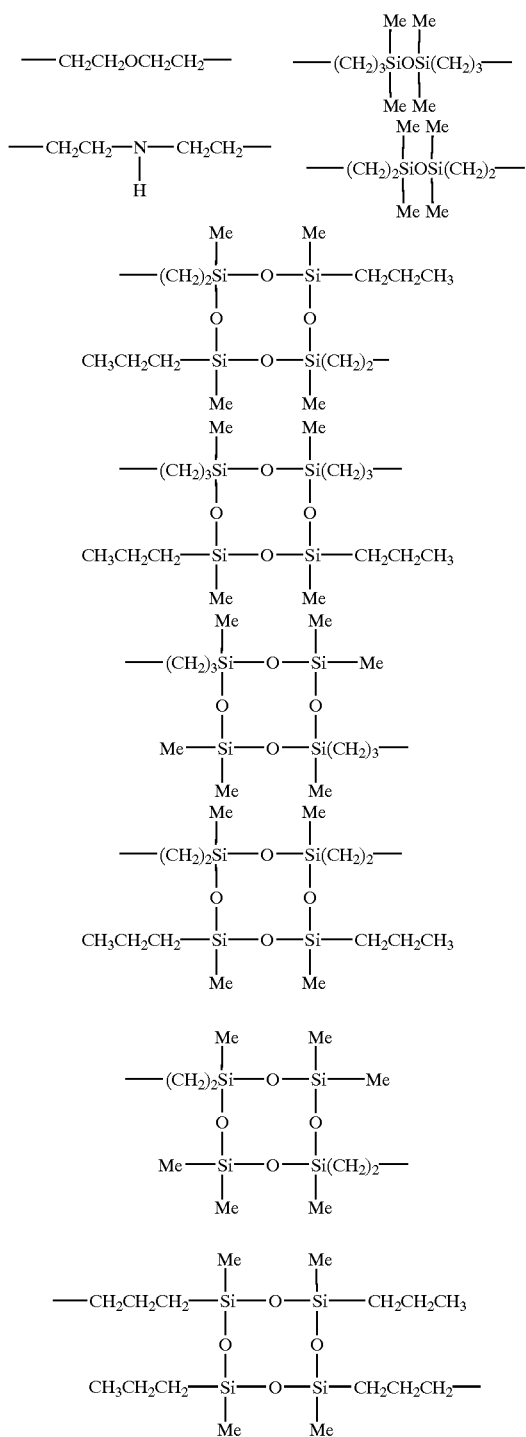

In the foregoing formulas, "Me" stands for methyl.

In above formula (3), $R^4$ and $R^5$ are each independently a divalent substituted or unsubstituted hydrocarbon group of preferably 1 to 10 carbons, and especially 2 to 6 carbons. Illustrative examples include alkylene groups such as methylene, ethylene, propylene, methylethylene, butylene and hexamethylene; cycloalkylene groups such as cyclohexylene; and any of the above groups in which some of the hydrogen atoms have been substituted with halogen atoms.

Specific examples of the group Q in formula (1) represented by above formula (2) or (3) include those having the following chemical formulas, wherein "Me" stands for methyl, "Ph" stands for phenyl, Rf is as described subsequently and X is a hydrogen atom, methyl or phenyl.

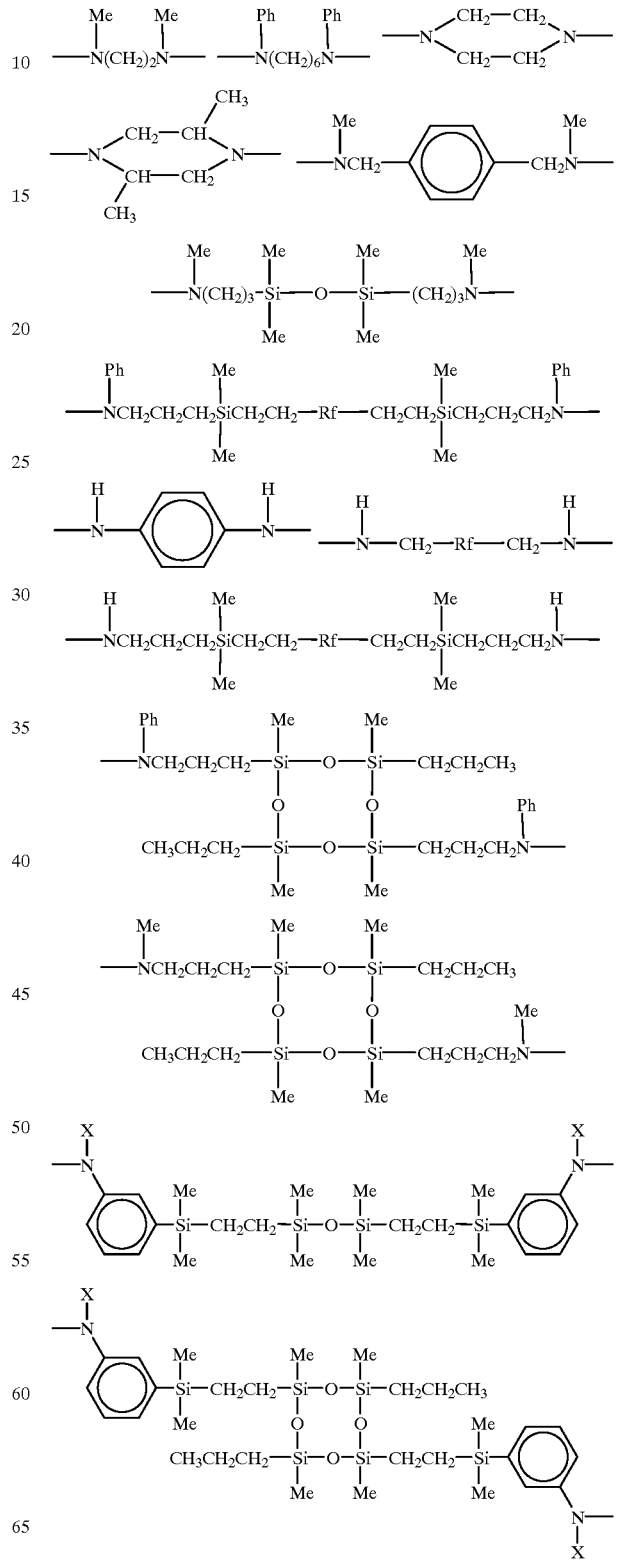

-continued

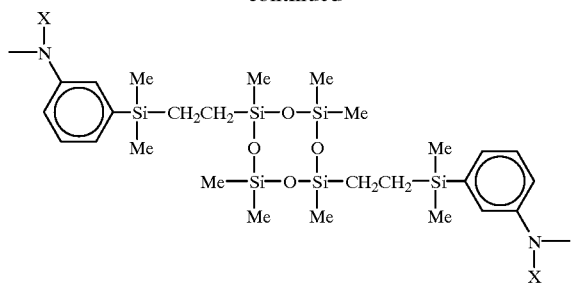

In formula (1), Rf is a divalent perfluoroalkylene group or a divalent perfluoropolyether group. Preferred divalent perfluoroalkylene groups include those of the formula $-C_mF_{2m}-$, wherein m is 1 to 10, and especially 2 to 6. Preferred divalent perfluoropolyether groups include those of the formulas

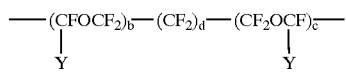

wherein Y is fluorine or a $CF_3$ group, the letters b and c are each positive integers such that the sum b+c is an integer from 2 to 200, and preferably from 2 to 110, and the letter d is an integer from 0 to 6;

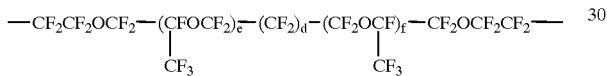

wherein the letter d is as defined above and the letters e and f are each 0 or a positive integer such that the sum e+f is an integer from 0 to 200, and preferably from 2 to 110;

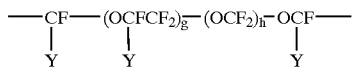

wherein Y is fluorine or a $CF_3$ group and the letters g and h are each integers from 1 to 20; and

wherein the letter i is an integer from 1 to 100.

Illustrative examples of Rf include $-C_4F_8-$, $-C_6F_{12}-$,

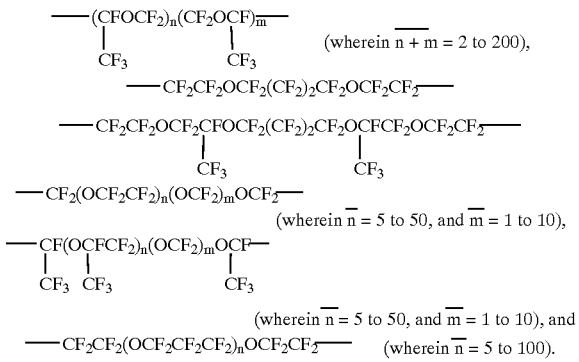

In formula (1), the letter "a" is 0 or a positive integer. Accordingly, the fluorinated amide compound of formula (1) includes at least one divalent perfluoroalkylene group or divalent perfluoropolyether group. The letter "a" is preferably an integer from 0 to 10, and most preferably an integer from 1 to 6.

In the practice of the invention, the fluorinated amide compound serving as component A may be anywhere from a low-viscosity polymer having a viscosity, as measured at 25° C. (the same applies below), of several tens of centistokes (cs) to a solid, crude rubber-like polymer. However, the use of a crude rubber-like polymer for heat-vulcanized rubber applications, or a polymer having a viscosity of about 100 to 100,000 cs for liquid rubber applications, is preferred for ease of handling. Too low a viscosity may result in a cured product having a small elongation for an elastomer, and thus a poor balance of properties.

The fluorinated amide compound of above formula (1) may be prepared as described below. Fluorinated amide compounds in which the letter a in formula (1) is 0 can be prepared by reacting a compound of general formula (4) below having acid fluoride groups on both ends with a primary or secondary amine compound of general formula (5) below in the presence of an acid acceptor such as trimethylamine.

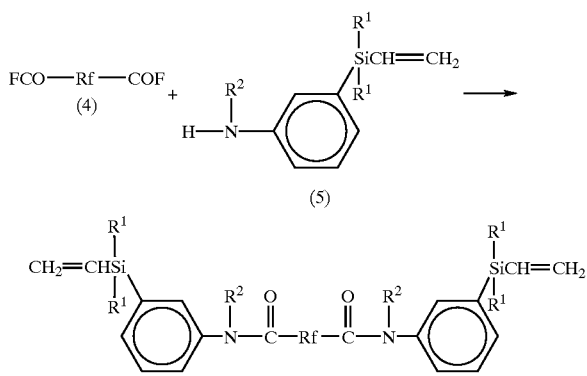

In the foregoing formulas, $R^1$, $R^2$ and Rf are as defined above.

Fluorinated amide compounds in which the letter "a" in formula (1) is a positive integer (that is, 1 or larger) can be prepared by reacting a compound of general formula (4) above having acid fluoride groups at both ends with a diamine compound of general formula (6)

H—Q—H     (6), wherein Q is as defined above, in the presence of an acid acceptor, and additionally reacting a primary or secondary amine compound of above formula (5).

No particular limitation is imposed on the ratio of the amounts in which the compound of formula (4) having acid fluoride groups on either end and the primary or secondary amine compound of formula (5) are charged, although it is preferable for the amount (a) of the formula (4) compound charged and the amount (b) of the formula (5) compound charged to be in a molar ratio (a)/(b) within a range of 0.1 to 1.2, and especially 0.2 to 0.5.

Neither the charging amount (a) of the formula (4) compound nor the charging amount (c) of the formula (6) compound is subject to any particular limitation provided the number of moles of (a) is at least as large as the number of moles of (c). The subscript a of the recurring unit in formula (1) may be set to a suitable value for the intended purpose by adjusting the ratio (a)/(c). A large (a)/(c) allows a polymer having a relatively small molecular weight to be synthesized, whereas a value for (a)/(c) which is close to unity enables the preparation of a polymer having a large molecular weight.

Any suitable reaction conditions may be used, although reaction at 20 to 100° C. for 1 to 8 hours, and especially at 20 to 50° C. for 2 to 4 hours, is preferred.

A fluorinated amide compound of formula (1) in which the Q group is linked through an intervening silicon atom may be prepared by using, for example, an amine compound of above formula (5) as the primary or secondary amine compound having an aliphatic unsaturated group (e.g., vinyl, allyl) to form by the above-indicated reaction a compound of the following general formula (7)

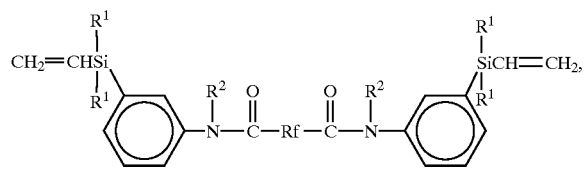
(7)

wherein $R^1$, $R^2$ and Rf are as defined above, and having vinyl groups at both ends, then reacting the formula (7) compound with, for example, an organosiloxane compound of the following general formula (8)

H—P—H  (8)

having two hydrosilyl groups on the molecule in the presence of an addition reaction catalyst.

In formula (8), P is a divalent organic group having a siloxane linkage. Specific examples of such groups include those shown below.

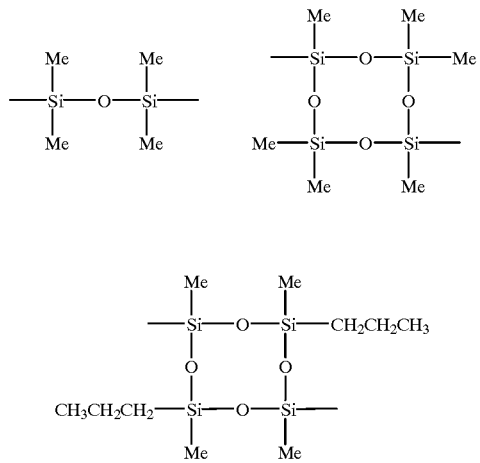

In the reaction, the compound of formula (7) having vinyl groups at both ends must be charged in a molar amount (d) which is larger than the molar amount (e) in which the compound of formula (8) is charged, although the ratio (d)/(e) must be no higher than 2. That is, the ratio (d)/(e) must be greater than 1 but cannot be any higher than 2.

A larger ratio (d)/(e) enables a polymer having a relatively small molecular weight to be prepared, whereas a ratio (d)/(e) close to unity enables a polymer of high molecular weight to be prepared.

Catalysts that may be used in the foregoing reaction include group VIII elements of the Periodic Table and compounds thereof. Illustrative examples include hexachloroplatinic acid, alcohol-modified hexachloroplatinic acid (see U.S. Pat. No. 3,220,972), complexes of hexachloroplatinic acid with an olefin (see U.S. Pat. Nos. 3,159,601, 3,159,662 and 3,775,452), platinum black or palladium supported on a carrier such as alumina, silica or carbon, rhodium-olefin complexes, and chlorotris(triphenylphosphine)rhodium (Wilkinson's catalyst). The catalyst may be added in a catalytic amount. The complexes mentioned above are preferably used after dissolution in a suitable solvent such as an alcohol, ketone, ether or hydrocarbon solvent.

It is advantageous to carry out the reaction at 50 to 150° C., and especially 80 to 120° C., for 2 to 4 hours.

The second essential constituent of the inventive composition, component B, is a fluorinated organohydrogen-siloxane which acts as a crosslinking agent and chain extender for the fluorinated amide compound (component A). The fluorinated organohydrogensiloxane has at least one monovalent perfluorooxyalkyl, monovalent perfluoroalkyl, divalent perfluorooxyalkylene or divalent perfluoroalkylene group and at least two, and preferably at least three, hydrosilyl groups (SiH) per molecule. Illustrative examples of such perfluorooxyalkyl groups, perfluoroalkyl groups, perfluorooxyalkylene groups and perfluoroalkylene groups include in particular monovalent perfluoroalkyl groups of the formula $C_mF_{2m+1}$-, wherein the letter m is an integer from 1 to 20, and preferably 2 to 10; divalent perfluoroalkylene groups of the formula —$C_mF_{2m}$-, wherein m is an integer from 1 to 20, and preferably 2 to 10; monovalent perfluorooxyalkyl groups of the formula

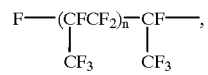

wherein n is an integer from 1 to 5; and divalent perfluorooxyalkylene groups of the formula

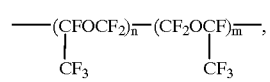

wherein $\overline{m+n}$ is an integer from 2 to 100.

The fluorinated organohydrogensiloxane may be cyclic or linear, or may even have a three-dimensional network structure. Preferred examples include those having on the molecule at least one monovalent substituent linked to a silicon atom, the substituent being a monovalent organic group which contains a perfluoroalkyl, perfluoroalkylether or perfluoroalkylene group and has one of the following general formulas.

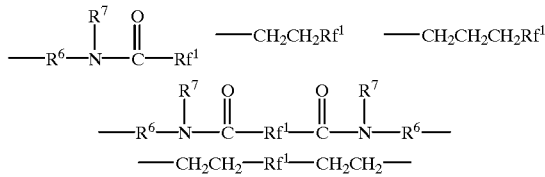

In the foregoing formulas, $R^6$ is a divalent hydrocarbon group of preferably 1 to 10 carbons, and especially 2 to 6 carbons, examples of which include alkylenes such as methylene, ethylene, propylene, methylethylene, tetramethylene and hexamethylene; and arylenes such as phenylene. $R^7$ is a hydrogen atom or a monovalent hydrocarbon group of preferably 1 to 8 carbons, and especially 1 to 6 carbons, and is exemplified by the same groups as mentioned above for $R^2$. $Rf^1$ is a monovalent perfluoroalkyl group, monovalent perfluorooxyalkyl group, divalent perfluorooxyalkylene group or divalent perfluoroalkylene group of the general formulas mentioned above.

In addition to monovalent organic groups having a monovalent or divalent fluorinated substituent (e.g., a perfluoroalkyl group, perfluorooxyalkyl group, perfluorooxyalkylene group or perfluoroalkylene group), other examples of monovalent substituents linked to a silicon atom that may be present on the fluorinated organohydrogensiloxane serving as component B include monovalent hydrocarbon groups of 1 to 10 carbons, and especially 1 to 8 carbons, preferably without an aliphatic unsaturated bond, as exemplified by the groups mentioned above for $R^2$.

The number of silicon atoms on the molecule in the fluorinated organohydrogensiloxane is not subject to any particular limitation, although about 2 to 60, and especially about 4 to 30, silicon atoms is preferred.

Illustrative examples of the fluorinated organohydrogensiloxane include those shown below, in which "Me" stands for methyl and "Ph" stands for phenyl. These compounds may be use singly or as combinations thereof.

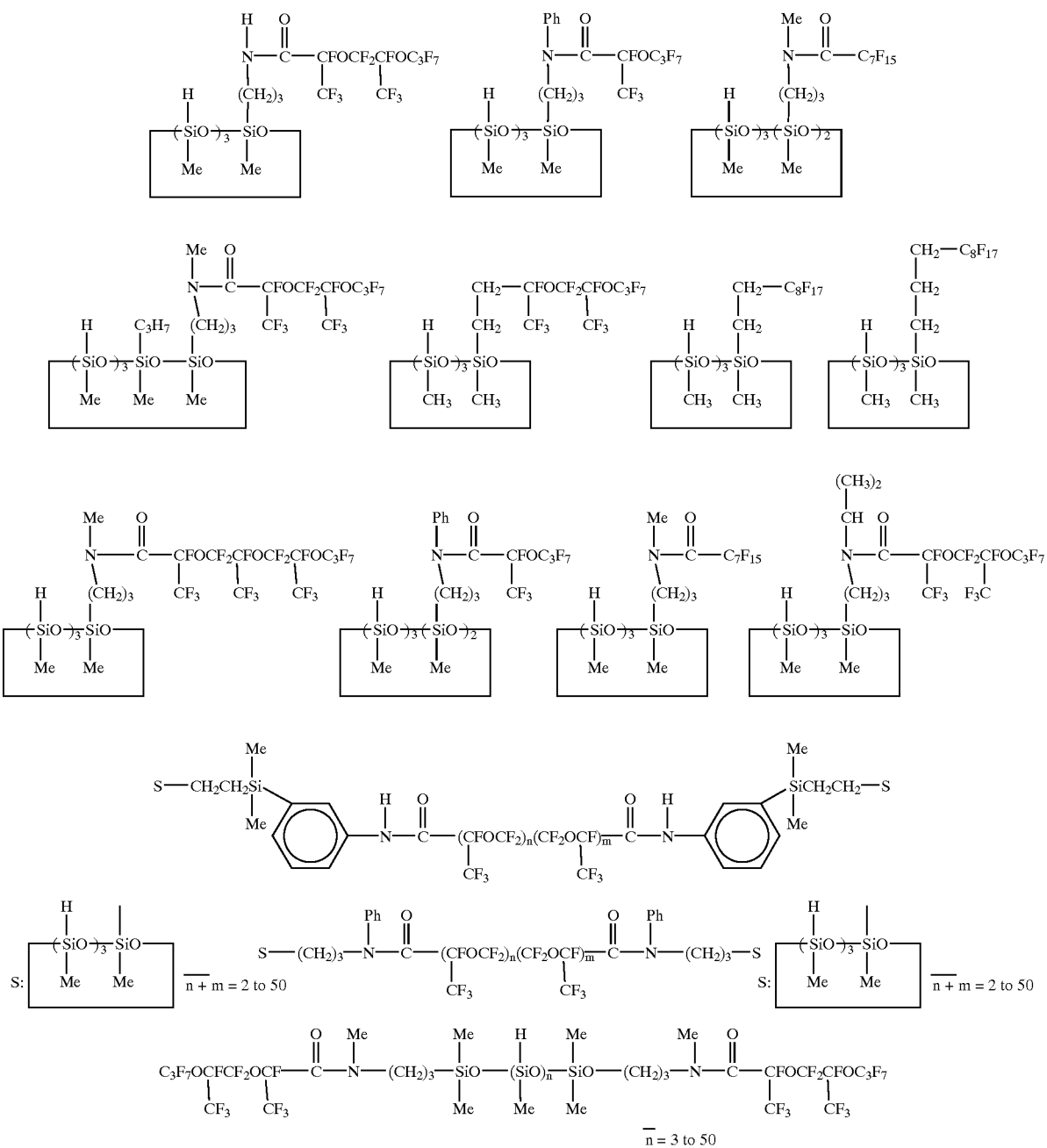

-continued

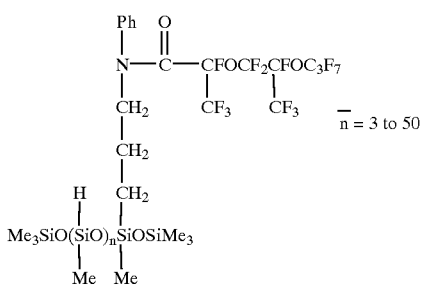

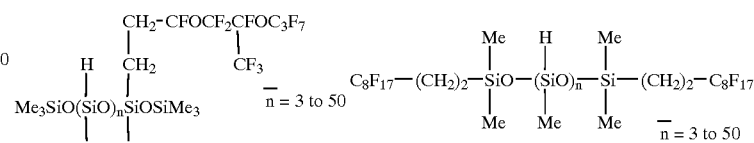

By using as component B a fluorinated organohydrogensiloxane which is compatible with the fluorinated amide compound serving as component A, a uniform cured product can be obtained from the curable composition of the invention.

Component B must be included in an amount which supplies 0.5 to 5 moles, and preferably 1 to 2 moles, of hydrosilyl (SiH) groups per mole of aliphatic unsaturated groups (e.g., vinyl, allyl, cycloalkenyl) in the overall composition. At less than 0.5 mole, the degree of crosslinking is inadequate, whereas more than 5 moles favors chain extension and may result in a poor cure as well as other undesirable effects, such as foaming and inferior heat resistance and compression set properties. Component B can generally be used in an amount within a range of 0.1 to 50 parts by weight per 100 parts by weight of component A.

The third essential constituent of the inventive composition, component C, is a platinum group compound that functions as a curing accelerator by catalyzing an addition reaction (hydrosilylation) between the fluorinated amide compound (component A) and the fluorinated organohydrogensiloxane (component B). Platinum group compounds, being compounds of precious metal, are generally expensive. For this reason, use is commonly made of platinum compounds, which are relatively easy to acquire.

Suitable, non-limiting examples of platinum compounds include hexachloroplatinic acid, complexes of hexachloroplatinic acid with olefins such as ethylene, with alcohols or with vinylsiloxane, and platinum/silica, platinum/alumina and platinum/carbon. Suitable known platinum group compounds other than platinum compounds include rhodium, ruthenium, iridium and palladium compounds, such as RhCl(PPh$_3$)$_3$, RhCl(CO)(PPh$_3$)$_2$, RhCl(C$_2$H$_4$)$_2$, Ru$_3$(CO)$_{12}$, IrCl(CO)(PPh$_3$)$_2$ and Pd(PPh$_3$)$_4$ (wherein "Ph" stands for phenyl).

Such catalysts may be used in a solid form if they are solid catalysts. However, to obtain a more uniform cured product, it is preferable to dissolve, for example, hexachloroplatinic acid or a complex thereof in a suitable solvent so as to give a solution which is compatible with the fluorinated amide compound serving as component A.

No limit is imposed on the amount of catalyst used, so long as the desired curing speed can be achieved. However, for economic reasons and to obtain a good cured product, addition of the catalyst in an amount containing about 1 to 1,000 ppm, and especially about 10 to 500 ppm, of platinum group atoms based on the overall amount of the curable composition is preferred.

The fourth essential constituent of the inventive composition, referred to hereinafter as component D, is an organosiloxane which is included to confer the composition with sufficient autoadhesive properties. The organosiloxane has, per molecule, at least one hydrogen atom bonded directly to a silicon atom (that is, a SiH group) and at least one epoxy group and/or trialkoxysilyl group bonded to a silicon atom through a carbon atom bonded directly to a silicon atom or through a carbon atom and an oxygen atom. Preferably, the organosiloxane also has at least one fluoroalkyl or perfluoropolyether group bonded to a silicon atom through a carbon atom bonded directly to the silicon atom.

The organosiloxane has a siloxane skeleton that may be cyclic, linear, branched or a mixture of these forms. The organosiloxane may be represented by one of the following average compositional formulas.

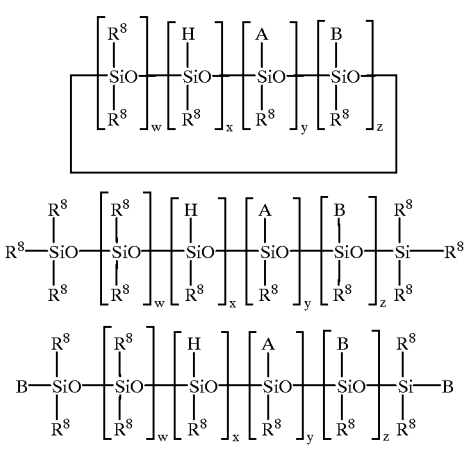

In the foregoing formulas, $R^8$ is a substituted or unsubstituted monovalent hydrocarbon group exemplified by the same groups as mentioned above for $R^1$, A is an epoxy group and/or trialkoxysilyl group bonded to a silicon atom through a carbon atom or through a carbon atom and an oxygen atom, and B is a perfluoroether group or perfluoroalkyl group bonded to a silicon atom through a carbon atom.

Suitable examples of A include groups of the formula

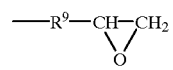

wherein $R^9$ is a divalent hydrocarbon group of 1 to 10 carbons, and especially 1 to 5 carbons, which may have an intervening oxygen atom (e.g., alkylene groups, cycloalkylene groups); and groups of the formula

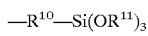

wherein $R^{10}$ is a divalent hydrocarbon group of 1 to 10 carbons, and especially 1 to 4 carbons (e.g., alkylene groups), and $R^{11}$ is a monovalent hydrocarbon group of 1 to 8 carbons, and especially 1 to 4 carbons (e.g., alkyl groups).

Suitable examples of B include groups of the formulas

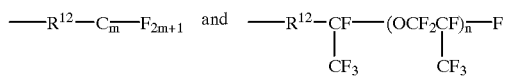

wherein $R^{12}$ is a group exemplified by the same groups as mentioned above for $R^{10}$ or a group of the above-mentioned formula

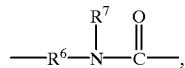

$R^6$ and $R^7$ being as described above, and the letters m and n are as defined above.

The letters w, x and z are each 0 or a positive integer, and the letter y is a positive integer, such that the sum w+x+y+z is generally about 2 to 60, and preferably about 4 to 30. In a cyclic siloxane structure, for ease of synthesis, the number of silicon atoms which form the siloxane ring is preferably about 3 to 50.

The organosiloxane may be prepared by carrying out a partial addition reaction of an organohydrogenpolysiloxane having at least three hydrogen atoms bonded to silicon atoms (SiH groups) per molecule with a compound having an aliphatic unsaturated group such as vinyl or allyl and an epoxy group and/or trialkoxysilyl group, and also, if necessary, with a compound containing an aliphatic unsaturated group and a fluoroalkyl or perfluoroether group. The number of such aliphatic unsaturated groups must be smaller than the number of SiH groups.

In the practice of the invention, the organosiloxane may be isolated following reaction completion, or the mixture may be used after removing only the unreacted starting materials and the addition reaction catalyst.

Specific examples of organosiloxanes that may be used as component D include those having the structural formulas shown below.

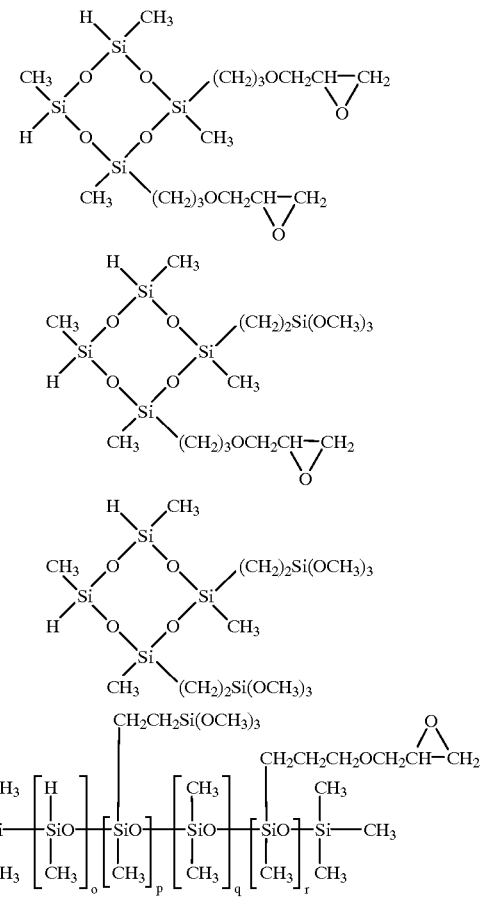

(the letters o, q and r being positive integers, and the letter p being 0 or a positive integer)

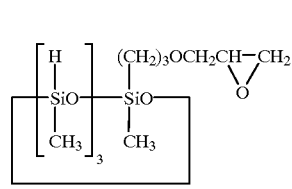
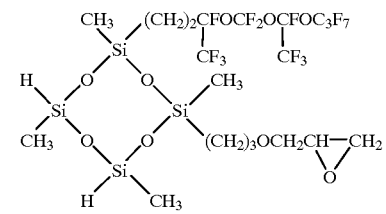
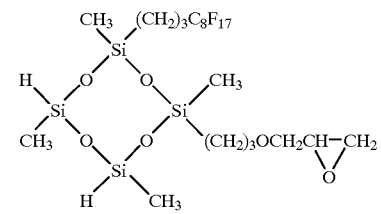
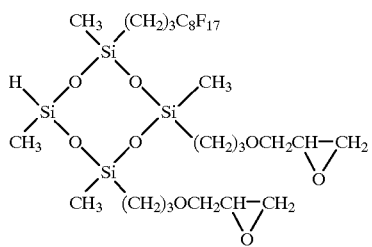
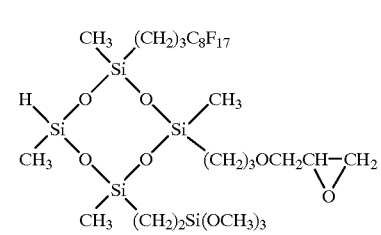
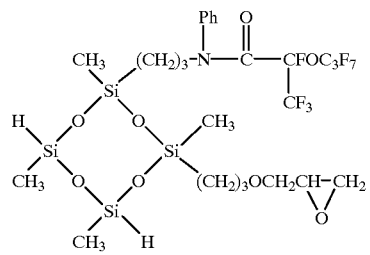

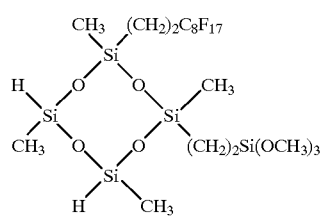
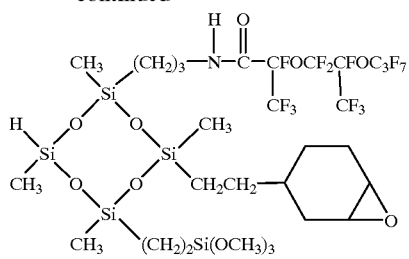
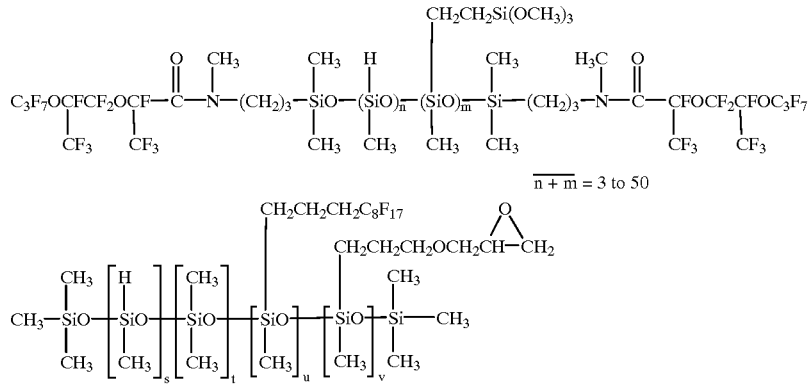

(the letters s, u and v being positive integers, and the letter t being 0 or a positive integer)

Any one or combination of two or more of the above organosiloxanes may be used.

Component D is used in an amount within a range of preferably 0.1 to 20 parts by weight, and most preferably 0.3 to 10 parts by weight, per 100 parts by weight of component A. At less than 0.1 part by weight, sufficient adhesive strength may not be achieved, whereas the use of more than 20 parts by weight tends to compromise the physical properties of the cured product and often interferes with curability of the composition.

Component B is used in an amount which is set based on the amount of the foregoing organosiloxane (component D) that is blended with the fluorinated amide component (component A). That is, as mentioned above, component B is included in an amount corresponding to 0.5 to 5 moles of SiH groups per mole of aliphatic unsaturated groups (e.g., vinyl, allyl, cycloalkenyl) in the overall composition.

The fifth essential constituent in the inventive composition, component E, is a silica powder having a BET specific surface area of at least 50 m$^2$/g. The purpose of the silica powder is to impart a suitable physical strength to the cured product obtained from the inventive composition, and also to induce uniform dispersion of the organosiloxane (component D) within the composition. The silica powder used as component E may be any finely divided silica powder having a BET specific surface area of at least 50 m$^2$/g known to be used as a filler in silicone rubber. Illustrative examples of such silica powders include fumed silica, precipitated silica and silica aerogel. Of these, fumed silica is especially preferred.

The silica powder has a BET specific surface area of at least 50 m$^2$/g, and preferably 50 to 400 m$^2$/g. At less than 50 m$^2$/g, the objects of the invention cannot be achieved.

The silica powder is preferably surface treated with any of various types of organochlorosilane, organodisilazane or cyclic organopolysilazane.

Component E is used in a range of preferably 0.5 to 40 parts by weight, and especially 1.0 to 30 parts by weight, per 100 parts by weight of component A. At less than 0.5 part by weight, the physical properties of the resulting cured product tend to decline, in addition to which adhesion may be unstable. On the other hand, at more than 40 parts by weight, the composition tends to have a poor flowability and the physical strength of the cured product obtained therefrom is often low.

Component F of the inventive composition is a fluorinated organosilane or a fluorinated organosiloxane, and is used as a surface treatment agent for the silica powder serving as component E. The fluorinated organosilane or fluorinated organosiloxane serving as component F is added when a mixture of the fluorinated amide compound (component A) and the silica powder (component E) is blended under the application of heat in a mixing apparatus such as a kneader. Heat treatment at this time, with the addition of a small amount of water if necessary, results in silanol formation on the surface of the silica powder. Such treatment improves the miscibility of the silica powder with the other components, making it possible to suppress the undesirable effect known as "crepe hardening" during storage of the composition. Additional advantages conferred at the same time include improved flowability of the composition and excellent bond durability.

The fluorinated organosilane or fluorinated organosiloxane serving as component F is not subject to any particular limitations concerning the molecular structure, provided the compound has, per molecule, at least one monovalent perfluorooxyalkyl, monovalent perfluoroalkyl, divalent perfluorooxyalkylene or divalent perfluoroalkylene group and at least one hydroxy group and/or alkoxy group bonded directly to a silicon atom. Examples of such perfluorooxyalkyl groups, perfluoroalkyl groups, perfluorooxyalkylene groups and perfluoroalkylene groups include monovalent perfluoroalkyl groups of the formula $C_mF_{2m+1}$-, wherein m is an integer from 1 to 20, and preferably 2 to 10; divalent perfluoroalkylene groups of the formula —$C_mF_{2m}$-, wherein m is an integer from 1 to 20, and preferably 2 to 10; monovalent perfluorooxyalkyl groups of the formula

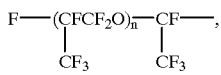

wherein n is an integer from 1 to 50; and divalent perfluorooxyalkylene groups of the formula

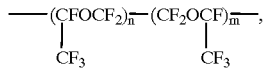

wherein $\overline{m+n}$ is an integer from 2 to 100.

Preferred examples of the fluorinated organosilane or fluorinated organosiloxane serving as component F include those having on the molecule at least one monovalent substituent linked to a silicon atom, the substituent being a monovalent organic group which contains a perfluoroalkyl, perfluoroalkylether or perfluoroalkylene group and has one of the following general formulas, wherein $R^6$, $R^7$ and $Rf^1$ are as defined above.

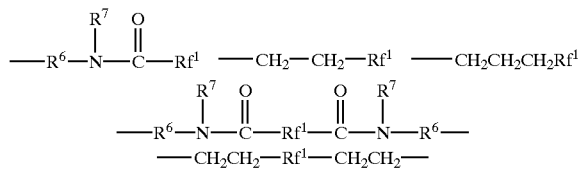

In addition to monovalent organic groups having a monovalent or divalent fluorinated substituent (e.g., a perfluoroalkyl group, perfluorooxyalkyl group, perfluorooxyalkylene group or perfluoroalkylene group), other examples of monovalent substituents linked to a silicon atom that may be present on the fluorinated organosilane or organosiloxane serving as component F include monovalent hydrocarbon groups of 1 to 10 carbons, and especially 1 to 8 carbons, preferably without an aliphatic unsaturated bond, as exemplified by the groups mentioned above for $R^1$.

The number of silicon atoms on the molecule in the fluorinated organosilane or organosiloxane is not subject to any particular limitation, although 1 or 2 silicon atoms are preferred in fluorinated organosilanes, and 2 to 20, and especially 3 to 10, are preferred in fluorinated organosiloxanes.

Such compounds may be prepared by applying a known hydrosilylation reaction or hydrolysis reaction to an organic fluorine compound having an alkenyl group such as allyl or vinyl, and having the above-described monovalent perfluoroalkyl, monovalent perfluorooxyalkyl, divalent perfluorooxyalkylene or divalent perfluoroalkylene group. Illustrative examples of such fluorinated organosilanes and fluorinated organosiloxanes are shown below. In the formulas, "Me" stands for methyl.

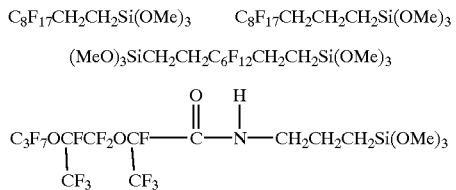

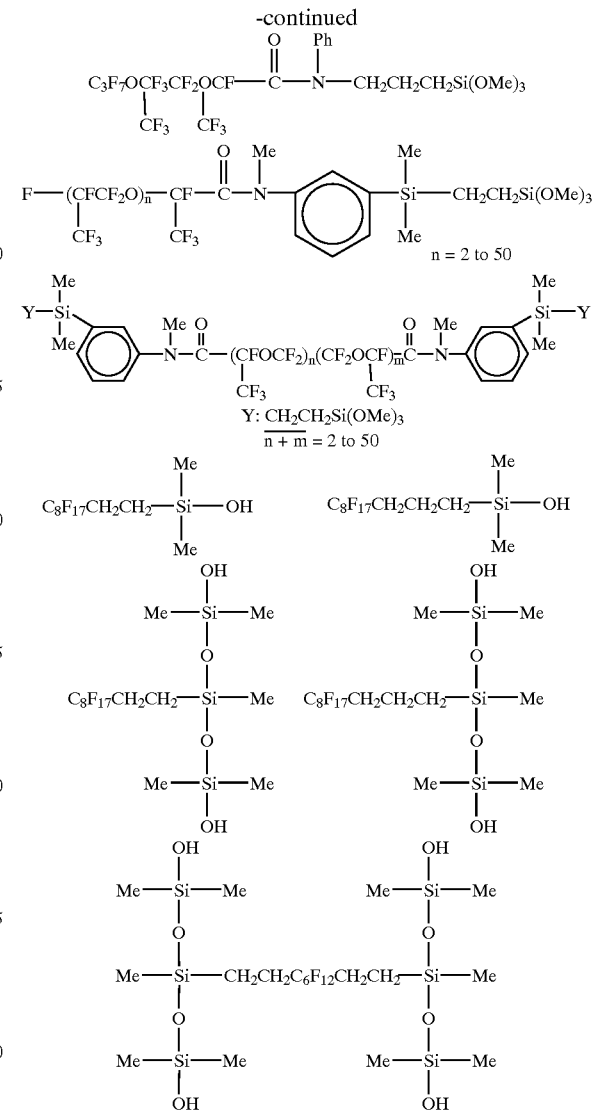

The above compounds may be used singly or as combinations of two or more thereof.

Component F is included in an amount within a range of preferably 1 to 30 parts by weight, and especially 1 to 20 parts by weight, per 100 parts by weight of the silica powder serving as component E. As less than 1 part by weight, the effects of treatment may be inadequate, whereas the addition of more than 30 parts by weight may compromise the physical properties of the cured product and may also hinder the curability.

If necessary, the curable composition according to the invention may have added thereto various additives to increase its practical utility. Specific examples of such additives include reaction regulators such as acetylene compounds (e.g., acetylenic alcohols and silylated acetylenic alcohols), olefinic siloxanes, ethylenically unsaturated isocyanurates, and any of the monovalent fluorinated substituent-bearing compounds described above; reinforcing or semi-reinforcing fillers such as silica powder, fused silica powder, diatomaceous earth and calcium carbonate; inorganic pigments such as titanium oxide, iron oxide, carbon black and cobalt aluminate; heat stabilizers such as titanium oxide, iron oxide, carbon black, cerium oxide, cerium hydroxide, zinc carbonate, magnesium carbonate and manganese carbonate; thermal conductivity-imparting agents such as alumina, boron nitride, silicon carbide and metal powders; and electrical conductivity-imparting agents such as carbon black, silver powder and conductive zinc oxide. In addition, perfluoropolyethers and/or fluorinated amide compounds of general formula (9) below which have no functional groups may be added as plasticizers, viscosity modifiers and flexibility-imparting agents.

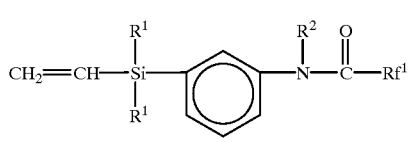

(9)

In formula (9), $R^1$, $R^2$ and $Rf^1$ are as defined above. Other additives that may be included are adhesion promoters such as carboxylic anhydrides and titanic acid esters, and adhesion-imparting agents and/or silane coupling agents other than component D. The above additives may be added in any suitable amount, insofar as the objects of the invention are attainable.

The curable composition of the invention may be prepared by the simple mixture of components A to F and any optional constituents using a suitable mixing apparatus such as a planetary mixer or a three-roll mill. However, because the silica powder serving as component E is surface-treated with the fluorinated organosilane or organosiloxane serving as component F, it is preferable to add the fluorinated organosilane or organosiloxane (component F) to a mixture of the fluorinated amide compound (component A) with the silica powder (component E), carry out heat treatment using a mixing apparatus such as a kneader, then add the remaining constituents and mix uniformly.

Depending on the type of functional groups on the fluorinated amide compound (component A) and the type of catalyst (component C), the curable composition thus prepared may be room temperature-curable. However, it is preferable to heat the composition to accelerate curing. For good adhesion to various types of base materials, it is particularly advantageous to carry out curing at a temperature of at least 60° C., and preferably 100 to 200° C., for a period of several minutes to several hours.

Depending on the intended application and purpose of the inventive curable composition, it may be advantageous to first dissolve the composition to a desired concentration in a suitable fluorocarbon solvent such as m-xylene hexafluoride or fluorinate prior to use.

The curable compositions of the invention can provide cured products having excellent resistance to solvents, chemicals and heat, outstanding low-temperature properties, a low water-vapor permeability and outstanding electrical characteristics. Moreover, when heated at a relatively low temperature for a relatively short time, such compositions cure to a product having good adhesion and durability of adhesion to base materials such as metals and plastics. This combination of characteristics makes the inventive compositions highly useful as adhesives for automotive parts as well as electrical and electronic components which require long-term reliability.

EXAMPLES

The following examples, wherein all parts and percents are by weight, are provided to illustrate the invention, and are not intended to limit the scope thereof. Properties such as viscosity and bond strength were measured at 25° C.

EXAMPLE 1

A kneader was charged with 100 parts of a polymer of formula (10) below (viscosity, 5,500 cs; average molecular weight, 17,000; vinyl group content, 0.012 mol/100 g), following which 60 parts of fumed silica having a BET specific surface area of 130 m² and 5 parts of the fluorinated organosiloxane of formula (11) below were added. The kneader contents were raised to a temperature of 170° C. and heat-treated while being kneaded. Next, 200 parts of the formula (10) polymer was added and the components were mixed to uniformity. The resulting mixture was cooled to below 40° C. and passed twice through a three-roll mill to give a base compound. Seventy parts of the formula (10) polymer was then added to 36.5 parts of the base compound and mixed. The resulting mixture had consecutively added thereto 0.25 part of a toluene solution of a platinum-divinyltetramethyldisiloxane complex (platinum concentration, 1.0 wt %), 0.3 part of a 50% toluene solution of ethynylcyclohexanol, 1.9 parts of a fluorinated organohydrogensiloxane of formula (12) below, 1.0 part of a fluorinated organohydrogensiloxane of formula (13) below and 1.5 parts of an adhesion-imparting agent of formula (14) below, following which the components were mixed to uniformity. The mixture thus obtained was subjected to a degassing operation, yielding the final composition.

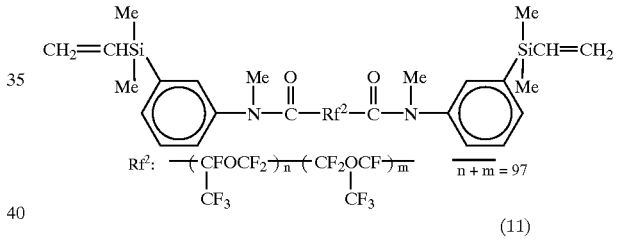

(10)

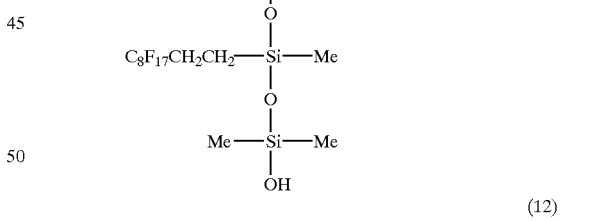

(11)

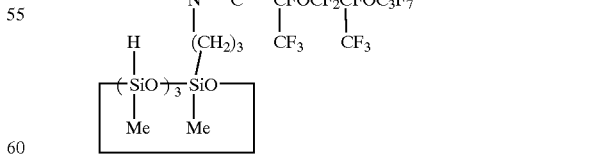

(12)

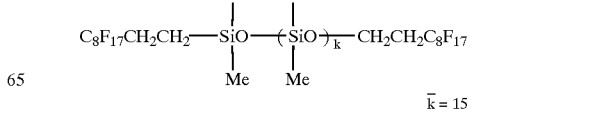

(13)

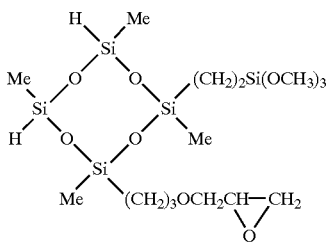

(14)

A 1 mm thick layer of the resulting composition was sandwiched between two 100×25 mm test panels of various types of adherends, each pair of like adherends being arranged so as to mutually overlap by 10 mm at the ends. The composition was then cured by heating at 150° C. for 1 hour, thereby giving an adhesion test specimen. Each of the resulting specimens was subjected to a tensile shear bond test (tensile test rate, 50 mm/min) and the adhesive strength and percent cohesive failure were determined. The results are shown in Table 1.

The cured product obtained in the manner described above was also subjected to the following durability tests. A. Pressure cooker test (121° C., 2 atmospheres, 50 hours) B. Heat resistance test (150° C., 500 hours) C. Gasoline immersion test (25° C., 100 hours)

The specimens taken out after each test was then subjected to the same tensile shear bond test as described above, and the adhesive strength and percent cohesive failure were determined. Specimens on which test A or test B was carried out were subjected to the bond test one hour after completion of test A or B. Specimens on which test C was carried out were subjected to the bond test immediately after completion of test C. The results are shown in Table 1.

EXAMPLE 2

A composition was prepared in the same way as in Example 1, except that fused silica surface-treated with dimethyldichlorosilane (BET specific surface area, 110 m$^2$/g) was used instead of the fused silica of Example 1 (BET specific surface area, 130 m$^2$/g). Results obtained from the bond test and bond durability tests are shown in Table 1.

EXAMPLE 3

A composition was prepared in the same way as in Example 1, except that fused silica surface-treated with hexamethyldisilazane (BET specific surface area, 130 m$^2$/g) was used instead of the fused silica of Example 1 (BET specific surface area, 130 m$^2$/g). Results obtained from the bond test and bond durability tests are shown in Table 1.

EXAMPLE 4

A composition was prepared in the same way as in Example 1, except that fused silica surface-treated with dimethyldichlorosilane (BET specific surface area, 110 m$^2$/g) was used instead of the fused silica of Example 1 (BET specific surface area, 130 m$^2$/g) and 4.5 parts of the fluorinated organosilane of formula (15) below was used instead of 5.0 parts of the fluorinated organosiloxane of formula (11) above. Results obtained from the bond test and bond durability tests are shown in Table 1.

$$C_8F_{17}CH_2CH_2Si\,(OCH_3)_3 \quad (15)$$

EXAMPLE 5

A composition was prepared in the same way as in Example 1, except that fused silica surface-treated with dimethyldichlorosilane (BET specific surface area, 110 m$^2$/g) was used instead of the fused silica of Example 1 (BET specific surface area, 130 m$^2$/g) and 1.5 parts of the adhesion-imparting agent of formula (16) below was used instead of 1.5 parts of the adhesion-imparting agent of formula (14) above. Results obtained from the bond test and bond durability tests are shown in Table 1.

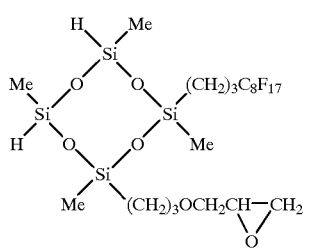

(16)

Comparative Example 1

A planetary mixer was charged with 100 parts of a polymer of above formula (10) (viscosity, 5,500 cs; average molecular weight, 17,000; vinyl group content, 0.012 mol/100 g), following which 10 parts of fumed silica surface treated with dimethyldichlorosilane (BET specific surface area, 110 m$^2$/g) was added. The mixer contents were then raised to a temperature of 170° C. and heat-treated for 2 hours while being kneaded. The resulting mixture was cooled to below 40° C. and passed twice through a three-roll mill to give a base compound. Forty parts of the formula (10) polymer was added to 66 parts of the base compound and the components were mixed. Next, the same blending operation was carried out as in Example 1, giving the final composition. Results obtained from the bond test and bond durability tests are shown in Table 1.

Comparative Example 2

A composition was prepared in the same way as in Comparative Example 1, except that fused silica surface-treated with hexamethyldisilazane (BET specific surface area, 130 m$^2$/g) was used instead of the fused silica surface treated with dimethyldichlorosilane of Comparative Example 1 (BET specific surface area, 110 m$^2$/g). Results obtained from the bond test and bond durability tests are shown in Table 1.

TABLE 1

| Shear bond test (kgf/cm²) | | EX 1 | EX 2 | EX 3 | EX 4 | EX 5 | CE 1 | CE 2 |
|---|---|---|---|---|---|---|---|---|
| Initial | Aluminum | 15(100) | 16(100) | 17(100) | 16(100) | 17(100) | 12(100) | 11(95) |
| | Stainless steel | 12(100) | 13(100) | 14(100) | 14(100) | 15(100) | 11(90) | 10(80) |
| | Nickel | 12(100) | 13(100) | 13(100) | 13(100) | 14(100) | 10(75) | 9(70) |
| | PBT resin | 11(100) | 12(100) | 11(100) | 14(100) | 15(100) | 10(80) | 10(85) |
| | Epoxy resin | 12(100) | 12(100) | 12(100) | 13(100) | 13(100) | 11(95) | 11(100) |
| Test A | Aluminum | 16(100) | 18(100) | 19(100) | 18(100) | 19(100) | 11(95) | 10(90) |
| | Stainless steel | 13(100) | 14(100) | 15(100) | 15(100) | 17(100) | 9(75) | 9(70) |
| | Nickel | 11(100) | 14(100) | 14(100) | 14(100) | 15(100) | 8(65) | 7(60) |
| | PBT resin | 10(100) | 11(100) | 10(100) | 13(100) | 13(100) | 8(70) | 9(75) |
| | Epoxy resin | 11(100) | 11(100) | 11(100) | 12(100) | 12(100) | 10(85) | 10(90) |
| Test B | Aluminum | 18(100) | 19(100) | 20(100) | 19(100) | 20(100) | 11(95) | 10(90) |
| | Stainless steel | 14(100) | 16(100) | 17(100) | 17(100) | 18(100) | 10(85) | 9(75) |
| | Nickel | 14(100) | 16(100) | 16(100) | 16(100) | 17(100) | 9(70) | 8(65) |
| | PBT resin | 13(100) | 14(100) | 13(100) | 17(100) | 18(100) | 9(75) | 9(75) |
| | Epoxy resin | 13(100) | 13(100) | 13(100) | 14(100) | 14(100) | 10(90) | 10(95) |
| Test C | Aluminum | 13(100) | 14(100) | 15(100) | 14(100) | 15(100) | 10(90) | 9(80) |
| | Stainless steel | 11(100) | 12(100) | 13(100) | 13(100) | 13(100) | 9(80) | 8(70) |
| | Nickel | 11(100) | 12(100) | 12(100) | 12(100) | 13(100) | 8(65) | 8(60) |
| | PBT resin | 9(100) | 10(100) | 9(100) | 11(100) | 12(100) | 8(70) | 9(75) |
| | Epoxy resin | 10(100) | 10(100) | 10(100) | 10(100) | 10(100) | 9(80) | 9(85) |

Figures in parentheses ( ) indicate the cohesive failure as a percentage of the surface area of overlap by the adherends.

Japanese Patent Application No. 2000-028762 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable composition comprising:

(A) a fluorinated amide compound of formula (1)

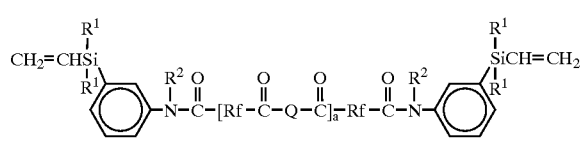

(1)

wherein $R^1$ is a substituted or unsubstituted monovalent hydrocarbon group, $R^2$ is a hydrogen atom or a substituted or unsubstituted monovalent hydrocarbon group, Q is a group of formula (2)

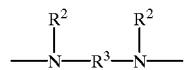

(2)

wherein $R^2$ is as defined above and $R^3$ is a substituted or unsubstituted divalent hydrocarbon group which optionally separated by at least one atom selected from the group consisting of oxygen, nitrogen and silicon atoms, or a group of formula (3)

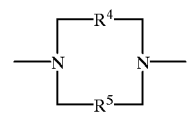

(3)

in which $R^4$ and $R^5$ are each independently a substituted or unsubstituted divalent hydrocarbon group, Rf is a divalent perfluoroalkylene or divalent perfluoropolyether group, and a is 0 or a positive integer;

(B) a fluorinated organohydrogensiloxane having at least one monovalent perfluorooxyalkyl, monovalent perfluoroalkyl, divalent perfluorooxyalkylene or divalent perfluoroalkylene group and at least two hydrosilyl groups per molecule;

(C) a catalytic amount of a platinum group compound;

(D) an organosiloxane having, per molecule, at least one hydrogen atom bonded directly to a silicon atom and at least one epoxy group or trialkoxysilyl group or both bonded to a silicon atom through a carbon atom or through a carbon atom and an oxygen atom;

(E) a silica powder having a BET specific surface area of at least 50 m²/g; and (F) an organosilane or organosiloxane having, per molecule, at least one monovalent perfluorooxyalyl, monovalent perfluoroalkyl, divalent perfluorooxyalkylene or divalent perfluoroalkylene group and at least one hydroxy group or alkoxy group or both bonded directly to a silicon atom;

wherein component B is present in an amount of 0.05 to 5 moles of hydrosilyl groups per mole of aliphatic unsaturated groups in the composition.

2. A composition of claim 1, wherein the organosiloxane of component D additionally has, per molecule, at least one fluoroalkyl or perfluoropolyether group bonded to a silicon atom through a carbon atom.

3. A composition of claim 1 that is obtained by adding component F to a mixture of component A with component E, carrying out heat treatment, and then adding the remaining components B, C, and D.

4. An adhesive comprising a composition of claim 1.

5. A metal or plastic having adhered thereto a composition of claim 1.

6. An automotive part or an electrical or electronic component having adhered thereto a composition of claim 1.

7. A composition of claim 1, wherein $R^1$ to and $R^2$ each, independently of another, contain 1 to 10 carbon atoms and have no aliphatic unsaturated bond, $R^3$ contains 1 to 20 carbon atoms, $R^4$ and $R^5$ each, independently of another, contain 12 to 10 carbon atoms.

8. A composition of claim 1, wherein $R^1$ and $R^2$ each, independently of another, are alkyl, cycloalkyl, alkenyl, aryl, aralkyl, or a halogen substituted alkyl, $R^3$ is unsubstituted or substituted with halogen and is an alkylene, cycloalkylene, or arylene, $R^4$ and $R^5$ each, independently or another, are unsubstituted or substituted with halogen and are alkylene or cycloalkylene.

9. A composition of claim 1, wherein a is 0 to 10.

10. A composition of claim 1, wherein a is 1 to 6.

11. A composition of claim 1, wherein (B) the fluorenated organohydrogensiloxane has at least three hydrosilyl groups per molecule.

12. A composition of claim 1, wherein in (B) and (F) the monovalent perfluorooxyalkyl, monovalent perfluoroalkyl, divalent perfluorooxyalkylene or divalent perfluoroalkylene group is a monovalent perfluoroalkyl group of formula $C_mF_{2m-1}$-. wherein m is an integer from 1 to 20; a divalent perfluoroalkylene group of the formula —$C_mF_{2m}$-, wherein m is an integer from 1 to 20, a monovalent perfluorooxyalkyl group of the formula

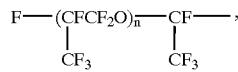

wherein n is an integer from 1 to 5; or a divalent perfluorooxyalkylene group of formula

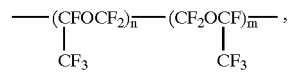

wherein m+n is an integer from 2 to 100.

13. A composition of claim 1, wherin (B) the fluorinated organohydrogensiloxane has linked to a silicone atom a group as defined for $R^2$.

14. A composition of claim 1, wherein in (B) the fluorinated organohydrogensiloxane has 2 to 60 silicone atoms, and in (F) the fluorinated organosilane has 1 to 2 silicone atoms, and the fluorinated organosiloxane has 2 to 20 silicone atoms.

15. A composition of claim 1, wherein component B is present in an amount of 1 to 2 moles of hydrosilyl groups per mole of aliphatic unsaturated groups in the composition.

16. A composition of claim 1, wherein the platinum group compound is hexachloroplatinic acid, complexes of hexachloroplatinic acid with olefins, with alcohols or with vinylsiloxane, and platinum/silica, platinum/alumina and platinum/carbon, and rhodium, ruthenium, iridium and palladium compounds.

17. A composition of claim 1, containing 0.1 to 20 parts by weight of (D) per 100 parts by weight of (A), 0.5 to 40 parts by weight of (E) per 100 parts by weight of (A), and 1 to 30 parts by weight of (F) per 100 parts by weight of (E).

18. A composition of claim 1, containing 0.3 to 10 parts by weight of (D) per 100 parts by weight of (A), 1 to 30 parts by weight of (E) per 100 parts by weight of (A), and 1 to 20 parts by weight of (F) per 100 parts by weight of (E).

19. A composition according to claim 1, wherein the silica powder (E) is fumed silica.

* * * * *